(12) United States Patent
Lin et al.

(10) Patent No.: US 10,627,343 B2
(45) Date of Patent: Apr. 21, 2020

(54) METHOD AND SYSTEM FOR EMISSIONS MEASUREMENT

(71) Applicants: Hai Lin, Rancho Cucamonga, CA (US); Gregor Arthur Waldherr, Rancho Cucamonga, CA (US)

(72) Inventors: Hai Lin, Rancho Cucamonga, CA (US); Gregor Arthur Waldherr, Rancho Cucamonga, CA (US)

(73) Assignee: Hal Technology, LLC, Fontana, CA (US)

( * ) Notice: Subject to any disclaimer, the term of this patent is extended or adjusted under 35 U.S.C. 154(b) by 52 days.

(21) Appl. No.: 15/943,462

(22) Filed: Apr. 2, 2018

(65) Prior Publication Data

US 2019/0302011 A1 Oct. 3, 2019

(51) Int. Cl.
| | |
|---|---|
| *G01N 21/3504* | (2014.01) |
| *G01N 21/39* | (2006.01) |
| *G01N 21/27* | (2006.01) |
| *G01N 21/59* | (2006.01) |
| *G01N 21/53* | (2006.01) |
| *G01N 21/17* | (2006.01) |
| *G01N 21/47* | (2006.01) |

(52) U.S. Cl.
CPC ....... *G01N 21/3504* (2013.01); *G01N 21/278* (2013.01); *G01N 21/39* (2013.01); *G01N 21/534* (2013.01); *G01N 21/59* (2013.01); *G01N 2021/1793* (2013.01); *G01N 2021/4709* (2013.01)

(58) Field of Classification Search
CPC ... G01N 21/3504; G01N 21/278; G01N 21/39
See application file for complete search history.

(56) References Cited

U.S. PATENT DOCUMENTS 9,551,616 B2 * 1/2017 McQuilkin ........... G01J 3/2803

* cited by examiner

*Primary Examiner* — Rebecca C Bryant

(57) ABSTRACT

Disclosed herein is a novel system and method for the remote characterization of visible emissions, and more particularly, to compact, optical sensors which can remotely measure the opacity of a visible emission plume from a stationary source. Assessing visible emissions is important for compliance with environmental regulations and to support the regulatory reporting needs of Federal and State inspectors. By reducing the power consumption of the laser source and the signal processing, a compact, handheld or hand portable, battery-operable opacity measurement system can be realized while allowing eye-safe operation. The system and method may also be applied to non-stationary sources.

17 Claims, 4 Drawing Sheets

METHOD AND SYSTEM FOR EMISSIONS MEASUREMENT

GOVERNMENT RIGHTS

The invention described herein was made under a contract from U.S. Air Force contract number FA8222-14-C-0005. The government may have rights under this invention.

REFERENCES CITED

U.S. patent Docs.

| | | | |
|---|---|---|---|
| 9,551,616 | January 2017 | McQuilkin et al. * | G01J 3/3823 |
| 9,041,926 | May 2015 | Ray et al. | 356/342 |
| 7,741,618 | June 2010 | Lee et al. | 250/458.1 |
| 7,495,767 | April 2009 | Kim et al. | 356/438 |
| 7,274,994 | September 2007 | Stedman et al. | 702/24 |
| 7,016,789 | March 2006 | Stedman et al. | 702/24 |
| 6,701,256 | March 2004 | Stedman et al. | 702/24 |
| 6,597,799 | July 2003 | Pfaff et al. | 382/100 |
| 6,593,582 | July 2003 | Lee et al. | 250/458.1 |
| 6,025,920 | February 2000 | Dec | 356/438 |
| 4,320,975 | March 1982 | Lilienfeld | 356/364 |

* cited by examiner

Other Publication(s):
A. W. Dybdahl, "The Use of Lidar for Emissions Source Opacity Determination, 2nd ed.," EPA-330/1-79-003-R, July 1981.
Code of Federal Regulations. Title 40—Protection of Environment. Chapter I—Environmental Protection Agency (continued). Subchapter C—Air Programs (continued). Part 60—Standards of Performance for New Stationary Sources (continued). Appendix A-4 to Part 60—Test Methods 6 through 10B, July 2019.

TECHNICAL FIELD

The present subject matter relates generally to remote characterization of visible emissions, and more particularly, to a compact, optical sensor which can remotely measure the opacity of a visible emission plume from a stationary source while allowing eye-safe operation. Assessing visible emissions is important for compliance with environmental regulations and to support the regulatory reporting needs of Federal and State inspectors. The system and method may also be applied to non-stationary sources, often referred to as fugitive sources.

BACKGROUND ART

This invention addresses the current need for a compact, battery-operable, visible emission characterization system capable of determining the plume opacity of remote stationary emission sources. The opacity of an attenuating medium, such as a smoke plume, is defined as one minus the transmittance of that medium. The transmittance of an attenuating medium is the fraction of incident radiant energy that remains after passing through that medium. The plume opacity of an emission source indicates whether it meets regulatory compliance. The U.S. Environmental Protection Agency (EPA) has regulations that determine the maximum permissible opacity threshold of an emission source, and an opacity value beyond that threshold indicates non-compliance with those regulations. Both the U.S. EPA and the California Air Resources Board (CARB) are closely following the compact opacity measurement technology developed and disclosed under this present invention. Accurate measurement of this plume opacity by an automated handheld device is the goal of the present invention.

Methods established by the EPA for the remote measurement of the opacity of emissions from stationary sources include visual determination (via EPA Method 9), determination by lidar (via EPA Method 9, Alternate Method 1), and determination by camera (via EPA Alternative Method ALT-082, ASTM D7520-09). Of these methods, only the lidar method allows opacity determination during both daytime and nighttime hours because it contains its own light source or transmitter and it is not dependent on ambient light contrast conditions. The lidar method is real-time, provides post-observation data/evidence, and is theoretically the most accurate method. Currently, the most common method of determining opacity is by visual determination (EPA Method 9). This method introduces human bias since it relies on the human eye as a sensor, involves extensive labor costs to train personnel and repeat field certification every six months, and does not provide good post-observation data/evidence. While superior, lidar methods have not gained popularity or been in practice so far because existing lidar instruments are bulky, not easily transportable, not eye-safe, and consume significant power. This invention describes an instrument that incorporates state-of-the-art technologies as well as signal processing techniques resulting in a compact, easily portable, potentially eye-safe, energy efficient, battery-operable lidar system for the determination of opacity.

A basic lidar system consists of an optical transmitter, an optical receiver, and associated signal processing and control electronics. In a pulsed lidar system, the optical transmitter sends optical pulses in a collimated light path through the atmosphere towards a target of interest. A small fraction of that transmitted light is backscattered to the optical receiver by atmospheric constituents, particles, or objects within light path. The receiver collects the backscattered light onto a detector that converts that light into an electronic signal. The temporal response of this signal corresponds to a distance from the lidar system, since light must travel from the transmitter to a distance or range R and back to the receiver. The amplitude of the signal with an emission source in the light path compared to the amplitude of the signal with no emission source in the light path allows determination of the opacity of the emission source.

The present disclosure is directed to a novel opacity measurement system that is compact, handheld or hand portable and includes all hardware in one unit. More specifically, the present disclosure is directed to an opacity measurement system that can include a laser transmitter, a receiver with one or more detectors, the processing hardware, and power supply in one compact, hand portable unit. Historically, high-energy pulsed laser sources were large table-top units; however, with recent technological advances laser transmitters are much more efficient and can be very compact. By processing the lidar return signal with low-power analog circuitry or low-power, low-sample rate digital acquisition hardware, the need for power hungry, high-sample rate, signal acquisition hardware is eliminated. For example, U.S. Pat. No. 6,593,582 (Lee) and U.S. Pat. No. 7,741,618 (Lee) both prefer high pulse repetition frequencies (a few kHz) to improve the SNR for their application, both require a large diameter telescope (30 cm) for eye-safety, and both detection schemes uses photon counting which requires high power signal processing hardware. This type of system design criterion is common for those skilled in the art and cannot be powered by a lightweight battery which is contrary to the design criterion for the handheld system disclosed in this invention. The combination of efficient lidar system and low-power acquisition method allows significant reduction in power consumption of the system. With power consumption reduced by several orders of magnitude on both transmitter and signal processing systems, the entire opacity measurement system can be packaged in a compact, handheld or hand portable, battery-powered unit. This is the basis of this invention.

SUMMARY OF INVENTION

In general, the disclosed invention relates to, but is not limited to, the measurement of the opacity of a visible emission plume from both stationary and non-stationary sources. Specifically, this disclosure relates to the design and construction of an apparatus that collects backscattered light for making such measurements from a remote location. As with any lidar system, the lidar system in the present disclosure includes an optical transmitter, an optical receiver, and associated signal processing and control electronics. Taken individually, the components of the disclosed lidar system are not necessarily unique; however, their specific combination and method of use comprise the novel opacity measurement system outlined in this disclosure. Specifically, the use of both a laser source with a low average power and a low-power signal processing system results in significant reduction in power consumption and allows construction of a battery-operable handheld or hand portable opacity measurement system for practical use.

The optical transmitter in the present disclosure consists of a pulsed laser source with a relatively low average power to keep system power consumption low. The specifications of the laser source, namely wavelength, pulse width, pulse energy, and pulse repetition frequency (PRF), determine the power consumption of the laser source. The wavelength of the laser source used for an opacity measurement system needs to be non-resonant with the various molecular constituents of the atmosphere and would be preferably ultraviolet or infrared to provide added eye-safety margin. The desired measurement range of the opacity measurement system, which includes opacity dynamic range and sensitivity over a desired distance, determines the necessary laser energy per pulse; the larger the range the higher the pulse energy. Thus, to keep the power consumption low, the PRF of the laser source is kept low to offset the desired high pulse energy. Keeping the power consumption of the laser system low is an integral part of this patent disclosure.

The optical receiver in the present disclosure consists of collection optics to receive the backscattered light and direct it onto one or more detectors. To reduce the contribution of the atmospheric return from non-laser wavelengths an interference filter is placed in the light path before a detector. More than one detector would be needed when implementing polarization separation or when using both low- and high-sensitivity detection schemes. The separation of a light beam into multiple components is known to those skilled in the art. The collected optical signal is converted into an electronic signal with detectors that are selected from a group consisting of regular photodiodes, avalanche photodiodes, solid-state photomultipliers, photomultiplier tubes, and/or CMOS detectors.

It is also possible to use multiple light sources with different wavelengths to realize wavelength-dependent backscatter responses in the system and may distinguish between different types of scattering sources. When multiple light sources with different wavelengths are used, the light from individual laser sources is combined into one transmitted light beam using methods known to those skilled in the art. The receiver collects all the necessary wavelengths and then separates them via wavelength dispersion or wavelength selection elements using methods known to those skilled in the art.

In order to keep the system power consumption low and make a handheld device possible, the signal processing hardware must also be a low power system. The signal processing methods may be implemented as either analog, digital, or a combination thereof. Our preferred approach consists of analog integration over a portion of the backscatter signal with subsequent sampling by a digitizer and storage for later processing. A purely digital approach consists of digitizing and storing the backscatter signal and then numerically integrating the necessary portion. For the above or any other signal processing approaches, the value obtained from a single signal acquisition may be used directly or averaged with values from other signal acquisitions. Averaging of multiple signal acquisitions is typically used to improve the accuracy of the result. Typically, the analog processing consumes significantly less power than high-speed data sampling or ultrafast digital processing. For example, sampling data at Gigahertz rates typically consumes tens of watts of electrical power while an analog integrator only consumes milliwatts of electrical power.

Following the procedure outlined in EPA Method 9, Alternate Method 1, the opacity of an emission plume is determined by comparison of two different signal acquisitions, one aimed at the emission plume and one aimed away from the emission plume. The opacity measurement system should first be aimed away from the emission source to obtain a reference signal. The results from the reference signal are then stored. Next the opacity measurement system is aimed at the emission source to obtain the plume signal. The opacity of the emission source can then be determined from these two measurements following EPA Method 9, Alternate Method 1. As per the EPA Method, additional reference signal acquisitions may also be required after the plume signal acquisitions.

The combination of a laser with low average power and a low-power signal processing system results in significant reduction in total power consumption and allows construction of a battery-operable opacity measurement system. With appropriate selection of laser parameters, the opacity measurement system can also meet laser safety standards for eye exposure.

DESCRIPTION OF EMBODIMENT

The above, as well as other objects and advantages of this disclosure, will become readily apparent to those skilled in the art from reading the following description of an embodiment of the invention. The description and drawings illustrate exemplary embodiments of the invention and serve to enable one skilled in the art to make or use the invention and are not intended to limit the scope of the invention in any manner. With respect to the methods disclosed and illustrated, the steps presented are exemplary in nature, and thus, the order of the steps is not necessary or critical.

Figure 1:
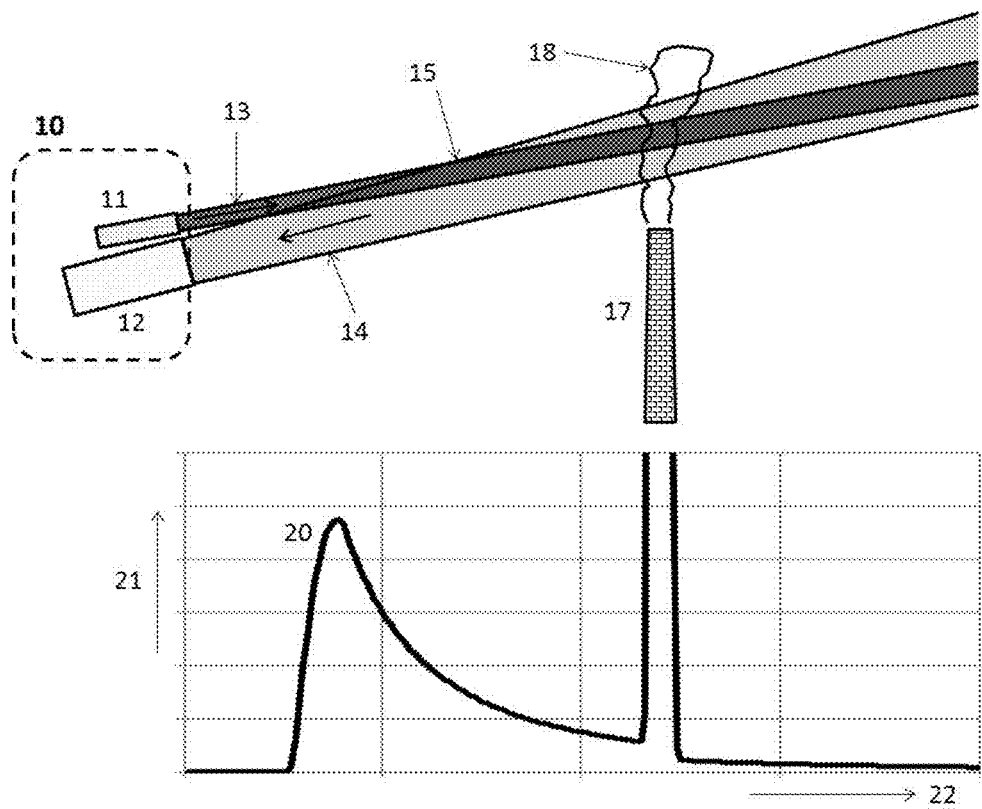
FIG. 1 shows a typical biaxial lidar system and the corresponding backscatter return signal.

The present disclosure is built upon a typical lidar system which includes an optical transmitter, an optical receiver, and associated signal processing and control electronics. In FIG. 1, a representative basic lidar system 10 is shown with a transmitter 11 and a receiver 12. A light pulse is transmitted along path 13 through the atmosphere towards a target of interest and a small fraction of that transmitted light is backscattered along path 14 to the lidar receiver from atmospheric constituents, particles, or objects within light path 13. In FIG. 1, the target is an emission plume 18 from an exhaust stack 17. The intensity of the backscattered light from aerosol particles and molecules is many orders of magnitude smaller than the source intensity, thus the optical transmitter is typically a high-energy pulsed laser and the optical receiver is highly sensitive. There are two types of lidar arrangements: coaxial and biaxial. In a coaxial system the light is transmitted and received along the same optical axis and in a biaxial system the optical axes are spatially separated. For both types of lidar systems, measurements typically start from a convergence distance 15 where the transmitter field-of-view and the receiver field-of-view fully overlap. The upper part of FIG. 1 displays this overlap for an example biaxial lidar system. Many alternative overlap arrangements are possible and are known to those skilled in the art. This disclosure applies to both coaxial and biaxial lidar systems.

As the light pulse is transmitted into the atmosphere towards the target, backscattered light is returned. The receiver collects the backscattered light onto a detector that converts that light into an electronic signal. The temporal response of this signal corresponds to a distance from the lidar system, since light must travel from the transmitter to a distance or range R and back to the receiver. This correspondence is given by R=c t/2, where c is the speed of light and t is the round-trip transient time from source to the plume. The lower part of FIG. 1 displays an example backscatter return signal 20 with amplitude 21 vs. range or time 22. The signal level 20 starts at zero, rises rapidly until it reaches a peak near the convergence distance, and then decreases in amplitude as $1/R^2$ due to atmospheric backscatter. The spike represents the backscatter signal due to an emission plume. The amplitude of the spike is much greater than that of the atmospheric return because the particulate density is far greater in the emission plume than in the surrounding air. The amplitude of the signal after the spike compared to the amplitude of the signal if there were no spike is related to the opacity of the emission plume.

Figure 2:
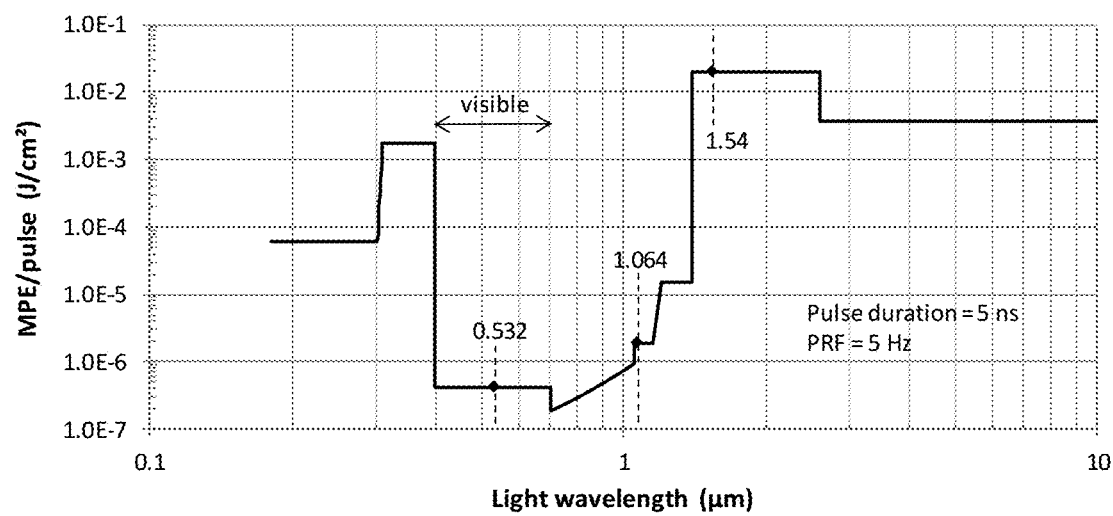
FIG. 2 is a graph of the maximum permissible exposure (MPE) per pulse at different light wavelengths. The graph presented is a specific example for light sources with a pulse duration of 5 ns and a repetition rate of 5 Hz.

Laser wavelengths used in an opacity measurement system can range from 0.2 μm to 11 μm where certain wavelengths are preferable over others. The wavelength of the laser source used for an opacity measurement system needs to be non-resonant with the various molecular constituents of the atmosphere, otherwise the attenuation will not be dominated by the atmospheric aerosol content. When dealing with open or public areas where people may intersect the path of the laser beam, the beam must meet the laser safety standards ANSI Z136.1 and IEC 60825-1 for eye and skin exposure. For pulsed laser sources, these standards specify the maximum permissible exposure (MPE) in units of energy per unit area. In FIG. 2, the MPE per pulse for a laser source with a pulse duration of 5 ns and a pulse repetition rate (PRF) of 5 Hz is shown for wavelengths from 0.2 μm to 11 μm. Similar figures can be developed for any combination of pulse duration and PRF. The figure shows that higher energy densities are permissible away from visible wavelengths (0.4-0.75 μm) at either ultraviolet wavelengths below 0.4 μm or infrared wavelengths greater than 1.4 μm. The table below presents numerical values taken from FIG. 2 for some common pulsed laser wavelengths. They show that going from any visible wavelength, i.e. 0.532 μm, to a wavelength of 1.064 μm allows a greater than threefold increase in energy density; however, going to a wavelength of 1.54 μm allows an increase in energy density of 40,000. Thus, the selected laser wavelength can have a significant impact on the permissible energy density for eye safety.

| Wavelength | 0.532 μm | 1.064 μm | 1.54 μm |
| --- | --- | --- | --- |
| MPE/pulse | 0.5 μJ/cm² | 1.8 μJ/cm² | 0.02 J/cm² |
| Beam diameter for 100 μJ pulse energy | 113 mm | 59.5 mm | 0.56 mm |

To keep the system eye-safe, the energy density must be less than the MPE rating. For a given laser source, this means the transmitter area must be large enough to keep the energy density at any location below the MPE/pulse. The table above shows the minimum beam diameters for a laser pulse with a Gaussian intensity profile, pulse energy of 100 μJ, pulse duration of 5 ns, and a pulse repetition rate (PRF) of 5 Hz. This table indicates that visible and near-infrared wavelength laser sources need their diameters significantly expanded to be considered eye-safe. It should also be noted that while the MPE rating applies to one single pulse, the rating does depend on the number of pulses per second (the PRF).

The optical transmitter for the opacity measurement system in this disclosure is a high-energy pulsed laser with low average power. For this application, the pulsed laser source is typically a Q-switched laser system with a pulse duration usually less than 10 nanoseconds. The power consumption of a pulsed laser system is determined from the product of its pulse energy, pulse repetition frequency (PRF), and laser efficiency. Since the efficiency typically depends on the type, or wavelength, of the laser source, the pulse energy and PRF become the adjustable parameters. To maintain the same relative sensitivity, every doubling of the measurement range quadruples the necessary pulse energy, leading to high pulse energies for large measurement ranges. Since high pulse energies are typically desired this means the PRF must be kept low. A method to keep low power consumption of the laser system is an integral part of this patent disclosure. Current state-of-the-art high pulse energy laser sources that can meet these requirements include diode lasers, fiber lasers, and diode pumped solid state lasers.

The optical receiver of the opacity measurement system has the flexibility to be implemented with one or more optical detectors with a telescope. To reduce the contribution of the atmospheric return from non-laser wavelengths, an interference filter, which transmits light in a passband around the laser wavelength and suppresses light outside the passband, is placed in the light path before a detector. More than one detector would be needed when implementing polarization separation or when using both low- and high-sensitivity detection schemes. Polarization separation, although not absolutely necessary, allows possible refinement of the opacity measurement and obtains additional information. To acquire the different polarization components of the received backscattered light, a polarization splitter could be used to separate the components and direct each toward separate detectors. Detectors with different sensitivities allows for extended range operation or automated target range detection. When using both low- and high-sensitivity detection, a beam splitter could be used to separate the incoming light into two light paths and direct each toward separate detectors. The separation of a light beam into multiple components, as described above, is known to those skilled in the art. Detectors are used to convert collected light into an electronic signal. Signal detection is typically realized with detectors selected from a group consisting of regular photodiodes, avalanche photodiodes, solid-state photomultipliers, photomultiplier tubes, and/or CMOS detectors. For weak backscatter signals, a detector may be operated in a way that individual photons are counted, but this also results in significant power consumption in the subsequent signal processing hardware. For strong backscatter signals, a detector may be operated in analog mode, and this mode is preferred in this disclosure.

The second aspect of keeping the system power consumption low for a compact system is low-power signal processing method. Many different signal processing methods may be implemented, which can be classified as analog approaches, digital approaches, or a combination of both. In each case, the detected signal may be optionally range-corrected to remove the $1/R^2$ nature of the response. For a digital approach the range-correction may be implemented either in analog before digitization or digitally after digitization, but for an analog approach the range-correction must use an analog implementation. Analog range-correction has been performed in prior art, see A. W. Dybdahl, 1981, and digital range-correction is straightforward, so they will not be described further. The preferred low-power approach described herein, is a combination approach that consists of analog integration over a portion of the backscatter signal with subsequent sampling by a digitizer. This digitized signal level is then stored for later processing. A purely digital approach would consist of digitizing and storing the backscatter signal and then numerically integrating the desired portion. For the above or any other signal processing approach, the value obtained from a single signal acquisition may be used directly or averaged with values from other signal acquisitions. Averaging of multiple signal acquisitions is typically used to improve the accuracy of the result. Typically, an analog processing approach consumes less power than a digital processing approach.

Figure 3:
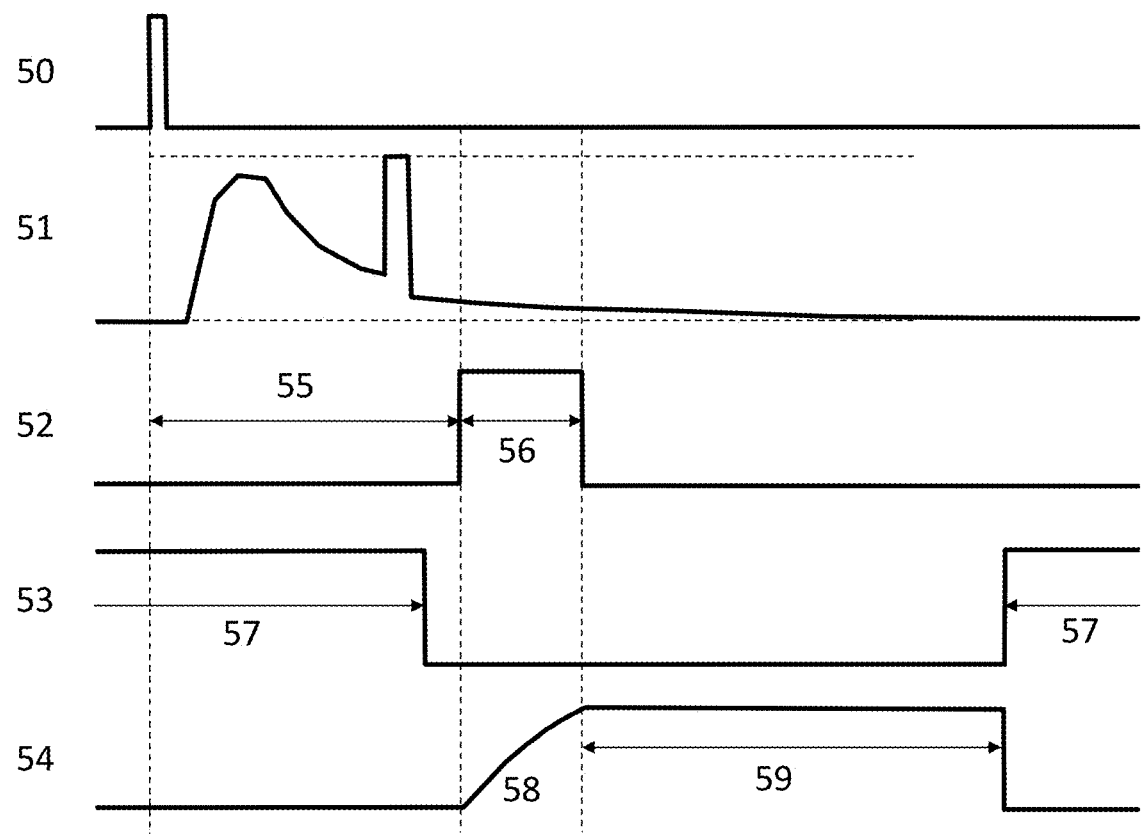
FIG. 3 displays a typical timing diagram for the present disclosure. In this example, the signal from beyond the emission plume is being averaged.

FIG. 3 illustrates an example timing diagram for accomplishing the signal processing in an opacity measurement system. The system is synchronized by a trigger signal 50 that is produced when the laser emits its light pulse. The timing, and thus ranging, of the backscatter return signal 51 is dependent on this trigger signal. The characteristics of the backscatter return signal 51 are the same as described for signal 20 of FIG. 1. The signal 51 is integrated over a finite period 56 after a delay 55. When using an analog integrator, pulse waveform 52 is used to turn the integrator on during period 56 and off otherwise. For a purely digital approach, period 56 would be the sampling period over which the numerical integration occurs. The delay 55 and integration period 56 are adjustable parameters of pulse waveform 52. Another pulse waveform 53 is generated to provide the period 57 over which the integrator output is reset and maintained at zero. The reset period 57 is another adjustable parameter. The resulting integrator output signal 54 remains at zero until the start of integration period 56, shows a rise 58 during the integration period 56, has the integrator output maintained during the hold period 59, and is then reset to zero before the next integration cycle. It is during the hold period 59 that a subsequent digitizer must sample the integrator output. The circuitry needed to create the pulse waveforms and perform the analog integration is known to those skilled in the art. By changing the delay 55, integration period 56, and reset period 57, any practical region of the backscatter signal 51 can be integrated. Multiple regions of the backscatter signal 51 may also be integrated by using multiple sets of integration circuitry.

Figure 4:
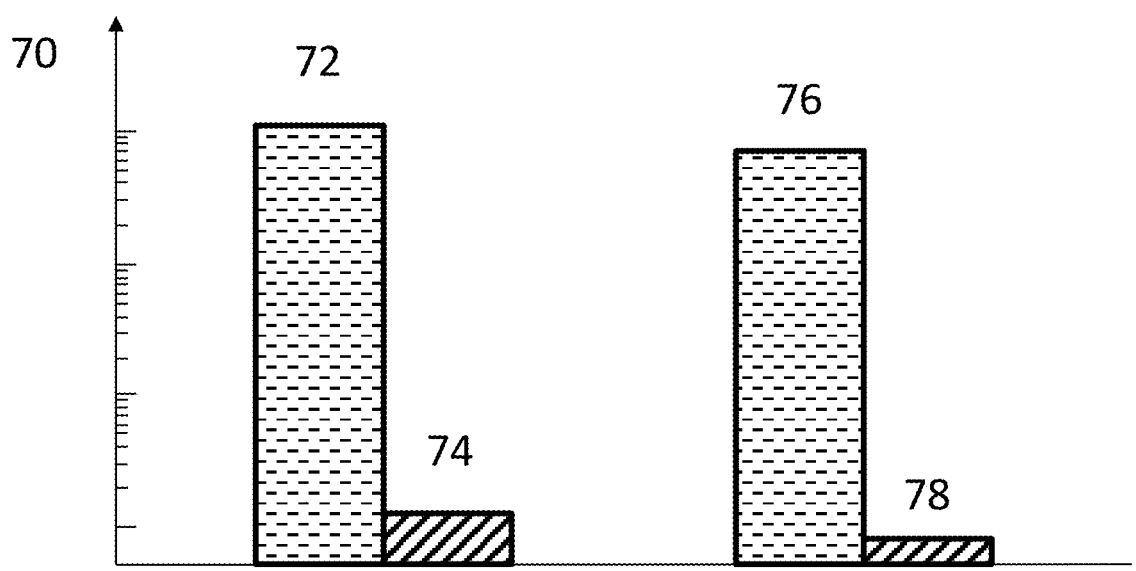
FIG. 4 graphs the power consumption of laser sources and signal processing hardware and compares prior art hardware with the present disclosure.

The ultimate goal of this disclosure is the realization of a compact, handheld or hand portable, battery-operable system for the remote measurement of opacity. Each of the three components of the system, the transmitter, the receiver, and the signal processing hardware, must have low power consumption. Typical receiver systems are low power and are battery-operable. The transmitter and signal processing hardware usually consumed significant power in prior art. FIG. 4 graphs the power consumption 70 of laser sources and signal processing hardware and compares prior art hardware with the present disclosure. Prior art laser sources 72 typically consumed significant power due to their combination of high pulse energy, high-PRF, and poor power conversion efficiency. New generation laser sources 74 can now be obtained with high pulse energy, low PRF, and improved power conversion efficiency. Similarly, prior art signal processing hardware 76 consumed significant power since they used high-speed sampling rates, typically greater than 100 MHz. The new signal processing hardware 78 in this disclosure consumes significantly less power since it uses either analog integration or low-power digitizers with low sampling speeds, under 10 MHz. The combination of low power for the transmitter 74 and low power for the signal processing hardware 78 allows the realization of a compact, handheld or hand portable, battery-operable system for the remote measurement of opacity.

This written description uses examples to disclose the invention and also enables any person skilled in the art to practice the invention, including making and using any devices or systems and performing any incorporated methods. The claims define the patentable scope of the invention, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A compact, handheld or hand portable system for the remote measurement of visible emissions, the system comprising:

an optical transmitter that provides single or multiple pulses of light from one or more light sources at a wavelength between 0.2 μm and 11 μm that are transmitted towards a target of interest;

an optical receiver that collects the backscattered light and guides it onto one or more detectors;

signal processing hardware configured to analyze the receiver output, store intermediate measurements, determine the opacity of the target;

and the optical transmitter, optical receiver, and signal processing hardware are powered by one or multiple compact, lightweight batteries.

2. The compact emissions measurement system described in claim 1 where an outgoing laser pulse of the system has an energy density low enough to meet eye-safety requirements.

3. The emissions measurement system described in claim 1 where there is one laser source that operates at one wavelength within the preferred eye-safe range from 1.4 to 2.6 μm.

4. The emissions measurement system described in claim 1 where more than one light source is used to allow refinement of the opacity measurement and distinguish between different types of scattering sources.

5. The emissions measurement system described in claim 1 wherein a narrow bandpass optical filter is provided before one or more detectors to remove background light.

6. The emissions measurement system described in claim 1 where the optical receiver splits the light into separate polarization components to allow possible refinement of the opacity measurement and obtain additional information.

7. The emissions measurement system described in claim 1 where the one or more detectors in the optical receiver are selected from a group consisting of regular photodiodes, avalanche photodiodes, solid-state photomultipliers, photomultiplier tubes, and/or CMOS detectors, and can be powered by a compact, lightweight battery.

8. The emissions measurement system described in claim 1 where the signal processing method is analog, digital, or a combination of both and is powered by a compact, lightweight battery.

9. The emissions measurement system described in claim 8 where the signal processing hardware consists of one or more low-power analog integrators controlled by associated timing signals to define the integration period and hold the result.

10. The emissions measurement system described in claim 8 where the signal processing hardware consists of a low-power digitizer.

11. The emissions measurement system described in claim 8 where the signal processing hardware includes a microcontroller to provide system control and local display of results.

12. The emissions measurement system described in claim 1 where the battery can be either standard or rechargeable.

13. A method for remotely measuring the opacity of emissions sources with a system described in any of the preceding claims, the method comprising the steps of:
transmitting single or multiple pulses of light from one or more light sources at a wavelength between 0.2 μm and 11 μm and directing them towards a target of interest;
collecting backscattered light from an optical receiver and guiding it onto one or more detectors;
and analyzing the receiver output with signal processing hardware that can also store intermediate measurements and determine the opacity of the target.

14. The method of claim 13 where the transmitter is directed towards a stationary visible emissions source for remote measurement of the opacity of said source.

15. The method of claim 14, wherein an opacity measurement is an absolute opacity measurement regardless of the type of emission source which is in compliance with the EPA requirements for Method 9, Alternate Method 1.

16. The method of claim 13 where the transmitter is directed towards a non-stationary visible emissions source for remote measurement of the opacity of said source.

17. The emissions measurement system described in claim 3 where the laser source is a 1.54-μm Er-doped solid-state laser.

* * * * *